Figure 1:
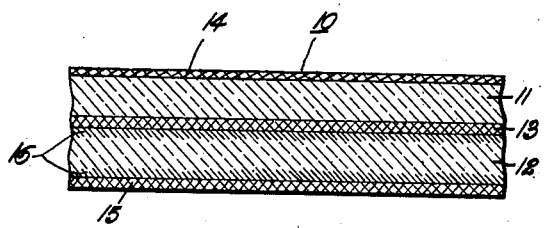

Sept. 5, 1939.   V. H. WILSHIRE   2,171,775

LAMINATED PAPER

Filed Dec. 5, 1935

Inventor
Van Hamm Wilshire
By Maréchal & Noe
Attorney

Patented Sept. 5, 1939

2,171,775

UNITED STATES PATENT OFFICE 2,171,775

LAMINATED PAPER

Van Hamm Wilshire, Dayton, Ohio, assignor to The Specialty Papers Company, Dayton, Ohio, a corporation of Ohio Application December 5, 1935, Serial No. 52,935

5 Claims. (Cl. 229—3.5)

This invention relates to laminated paper material and also relates to the packaging of butter and other products having a grease and water or moisture content.

One object of the invention is the provision of a laminated paper sheet which is greaseproof, resistant to the passage of water or moisture, and which combines with these qualities the ability to retain its strength when moist or wet.

Another object is the provision of a wax-bonded laminated sheet comprising a wax-absorbent layer of paper having bonded to it a sheet of material of the type known to the trade as vegetable parchment.

Another object is the provision of a package containing a product such as butter or other substance having a grease and water content which should be preserved, the container or cover being made from a single sheet of laminated material that is folded and then sealed, as by heat, to form a greaseproof, moistureproof unit which does not deteriorate in the presence of free water and which is cheap, light in weight, and easily applied.

Other objects and advantages of the invention will be apparent from the following description, the accompanying drawing, and the appended claims.

Figure 2:
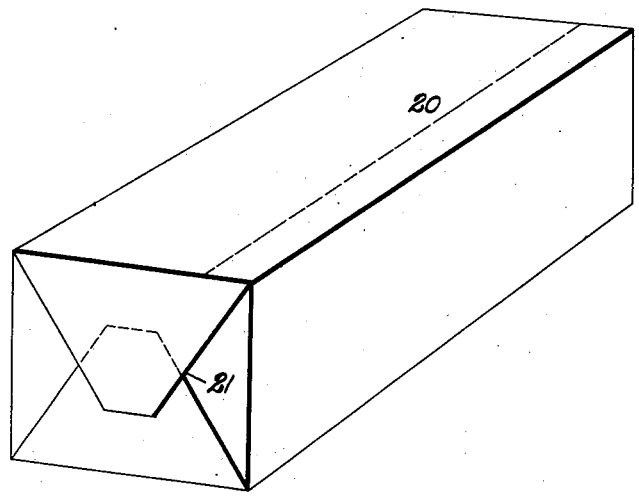

In the drawing:

Fig. 1 is a sectional view on a greatly enlarged scale showing the laminated sheet of the present invention; and Fig. 2 is a perspective view of a sealed package made from this material in accordance with the present invention.

With more particular reference to the drawing, in which one form of the invention is illustrated, 10 generally designates a laminated sheet of material, this material comprising a sheet or layer 11 of vegetable parchment, held to a sheet or layer of absorbent paper 12 by an intermediate thin layer 13 of bonding material, which is preferably a wax such as paraffin or like substance having moisture or water proofing as well as adhesive qualities. The wax-absorbent sheet of paper is provided with a surface coating of paraffin as indicated at 15 and a surface coating of paraffin may, if desired, be provided on the exposed surface of the vegetable parchment sheet, as indicated at 14, although such coating 14 may be unnecessary in many instances of use. The paraffin is also impregnated at least to some considerable extent into the body portion of the paper layer 12, as indicated at 16. If a translucent sheet of material is desired, the wax is thoroughly impregnated into the body of the sheet 12.

The vegetable parchment sheet 11 may be a tough sheet of rather low finish, made from rags or as a sulfite spruce sheet treated with sulfuric acid, as well understood in the trade. This paper, which is comparatively high in strength possesses the property of maintaining its strength to a very large degree when wet or moist, and is highly greaseproof. The thickness of this paper layer depends of course on the requirements to be met by the finished product, but it has been found quite satisfactory to employ a sheet that weighs about 30 pounds per ream of 24" x 36" sheets.

The sheet or layer of wax-absorbent paper 12 is preferably a little bulkier or thicker than the vegetable parchment sheet. Its weight may be about 40 pounds per ream, and using a total wax content of about 30 pounds per ream it will be understood that the duplex sheet is about 100 pounds per ream. The layer 12 is preferably a calendered or rather high finish sulfite sheet of strong good quality paper, preferably opaque and containing a considerable amount of opaque filler or coating substance that is of the color desired, usually white, so that the surface of the sheet is better able to present and contrast with the printing matter that usually is employed on the wrapper of a package of butter or other food products.

This laminated or duplex sheet of material is preferably made by running a web of vegetable parchment paper and a web of wax absorbent paper through the same hot bath of paraffin so that the sheets are supplied under submerging rolls. After leaving the bath, and while still hot, the two sheets meet at the nip of a pair of rolls which are pressed yieldingly towards one another and which serve to press the sheets together and to squeeze out any air that may tend to be entrapped between the sheets. Before passing together through the nip of a pair of rolls, the wax-absorbent sheet may travel a suitable distance in contact with a heated roll to afford time in which the wax can become impregnated into the body of the sheet for a substantial depth. After passing through the nip of the rolls the laminated or duplex sheet then goes to a suitable cooling means such as cooling rollers or cooling water bath.

If it desired that the coating of wax on the outer or exposed side of the parchment sheet be omitted entirely, the wax may be applied as by means of a wax pickup roll to only that side of the vegetable parchment sheet that is to be placed in contact with the wax-absorbent sheet.

A duplex sheet made in accordance with this invention is specially suitable for packaging or wrapping butter and similar edible or other products that contain free water or a large amount of moisture and which are also of a greasy or oily character. Of course the substance packaged by this duplex sheet may not have all the properties mentioned, and the sheet may, if desired, be used for packaging a material that is to be kept in a dry condition and penetration of grease and moisture or both prevented from sources outside the wrapper.

Butter has ordinarily been wrapped in an inner wrapping that is provided to hinder or prevent the passage of grease, and a separate outer box of paperboard is employed on outside of this inner wrapping, the outer box having flaps which tuck into place, leaving cracks along the sides of the end flap. Instead of these two covers, a single wrapping made from the duplex material of the present invention is employed, to effectively prevent the passage of water or moisture and also prevent the passage of grease. This single sheet of material may be made much lighter in weight than the combined sheets of the two wrappers previously used, for neither the greaseproof layer nor the wax-absorbent sheet needs to be made of very great thickness, as each sheet is rigidified and reinforced by the other and the duplex sheet thus formed need be made only sufficiently strong and rigid to satisfy the usual wrapping requirements. As the vegetable parchment side of the duplex sheet is placed next to the butter or other greasy matter contained in the package, this layer may contain some water but will still retain its strength and will not tear or stick in pieces on the butter when the package is unwrapped. The outer layer effectively prevents the passage of water so that the full weight of the package is retained over long periods of time. This is important in packaging butter for butter contains a comparatively large percentage of water.

While a very satisfactory package may be made by merely wrapping butter or the like in a single duplex sheet of the present invention without sealing the package, a more attractive and more sanitary package and one that is better adapted to prevent the loss of water or moisture may be provided by sealing the ends of the package where they are overlapped as at the ends or on the sides of the contained product, as illustrated in Fig. 2 of the drawing in which one form of folding arrangement is illustrated merely as an example of a form that may be used. These ends of the sheet may be sealed upon other portions of the sheet by heat, as by applying a heated iron to the ends of the package. This temporarily melts the surface paraffin on one portion of the wrapper and seals the package against the loss of moisture so that the weight of the package will be constant.

It has been mentioned above that a package of butter or the like having a covering or envelope in accordance with the present invention gives a number of advantageous features in that it serves to retain the grease content from passing through the covering, serves to retain the water content from passing through the covering, and can be made comparatively light in weight and therefore more economical. This item of expense is of considerable importance. Where is is desired that the outer surface of the wrapper should be white or with some other suitable color and thus be better able to display the printed matter, a considerable saving is effected by reducing the thickness of this portion of the wrapper, as it would be quite expensive to have a comparatively thick paperboard material so loaded with white filler as to produce a white surface. A further considerable saving in expense is effected because a single wrapping or covering sheet may be used, because the material may be supplied in roll form to the packing machine, and a single packaging operation is carried out as the material is wrapped on the contained article. It will be quite apparent that the wrapping operation using a single sheet of material can be effected quicker and more economically than wrapping the article in a sheet of material followed by placing the wrapped article in a carton or box.

A further financial saving is effected by reason of the reduction in the amount of paper employed as a wrapping for the article. The single duplex sheet may be made to have satisfactory strength even though this sheet is considerably thinner than the total thickness of the two superimposed layers of covering ordinarily used for butter of the like. This effects a considerable saving in freight charges, as the weight of the wrapping constitutes a substantial proportion of the weight of the entire package and contents.

Still another important advantage of the the present form of covering or envelope is that it better retains the flavor of the butter or other substance having like qualities as to grease content, water or moisture content, flavor, etc. Food products of many kinds have a water content and a grease content and have a flavor or aroma which should be preserved as much as possible. The sealing of the wrapper or envelope that can be effected in the packaging of such articles in accordance with the present invention serves to retain this flavor, as has been demonstrated by actual tests. And because of the imperviousness of the paper and the nature of its two constituent sheets as well as the paraffin with which they are treated and with which they are sealed, the wrapping will minimize the danger of the product wrapped from being tainted by sources outside of the wrapper.

A further important feature of applicant's package is that the container has considerably better insulating qualities than the normal package coverings now employed. The paper itself is a comparatively good insulator, and the paraffin bond and coating further improves the heat insulating qualities of the paper, and since all openings or cracks are tightly sealed by the paraffin itself where one fold is applied to another, no small cracks or openings are left through which a circulation of air can take place. It has been found that products such as butter, packaged in accordance with this invention, after being removed from a refrigerated place will stay cold and consequently hard for a considerably longer period than prior packages of products of similar character.

While the products herein described constitute preferred embodiments of the invention, it is to be understood that the invention is not limited to these precise products, and that changes may be made therein without departing from the scope of the invention which is defined in the appended claims.

What is claimed is:

1. A container for butter or the like comprising a wrapping which is sealed substantially airtight and formed of a single waterproof and greaseproof pliable composite paper sheet having an inner surface of vegetable parchment, and an outer surface of paraffin-containing opaque paper of light color bonded by a layer of paraffin to the vegetable parchment, the outer layer having a surface coating of paraffin, bonded to the other portions of the wrapping where in contact therewith.

2. A container for foods which have a substantial grease and water content, said container being formed of a single composite pliable paper sheet folded into a closed shell and sealed closed, the composite sheet being substantially greaseproof and waterproof and embodying a vegetable parchment layer and a layer of wax-absorbent paper having paraffin impregnated therein at opposite sides thereof and held throughout its extent to the layer of vegetable parchment by an interposed layer of paraffin, the outer side of the wax absorbent paper having a surface coating of paraffin and bonded thereby to contacting portions of the said container.

3. A composite pliable sheet of paper which can be readily folded and used as a wrapper and which is substantially greaseproof and waterproof, said sheet comprising a thin layer of vegetable parchment and a thicker layer of wax absorbent paper having wax impregnated therein and held throughout the extent of such wax absorbent paper to the layer of vegetable parchment by a quantity of wax which is interposed between the two paper sheets.

4. A composite pliable sheet of paper which can be readily folded and used as a wrapper and which is substantially greaseproof and waterproof, said sheet comprising a layer of vegetable parchment and a layer of wax-absorbent paper having wax impregnated therein at opposite sides thereof and held throughout its extent to the layer of vegetable parchment by a quantity of wax which is interposed between the two paper sheets, and a wax coating on the outer side of the wax-absorbent sheet.

5. A composite pliable sheet of paper which can be readily folded and used as a wrapper and which is substantially greaseproof and waterproof, said sheet comprising a layer of vegetable parchment and a layer of smooth finished calendered wax-absorbent paper, the wax absorbent paper being somewhat heavier than the layer of vegetable parchment and having paraffin impregnated therein at opposite sides thereof and held throughout its extent to the layer of vegetable parchment by a quantity of paraffin which is interposed between the two sheets, a paraffin surface coating on the outside of the vegetable parchment layer, and a paraffin surface coating on the outside of the wax-absorbent paper, the total quantity of paraffin being about the same as the weight of the vegetable parchment sheet.

VAN HAMM WILSHIRE.